United States Patent [19]

Schick

[11] 4,191,477

[45] Mar. 4, 1980

[54] PROCESS AND APPARATUS FOR THE SEPARATE EVALUATION OF IMAGE CONTENTS IN TWO COORDINATE DIRECTIONS OF MOTION

[75] Inventor: Dieter Schick, Solms, Fed. Rep. of Germany

[73] Assignee: Ernst Leitz Wetzlar GmbH, Wetzlar, Fed. Rep. of Germany

[21] Appl. No.: 827,075

[22] Filed: Aug. 23, 1977

[30] Foreign Application Priority Data

Aug. 23, 1976 [DE] Fed. Rep. of Germany ....... 2637844

[51] Int. Cl.² .............................................. H04N 7/18
[52] U.S. Cl. ..................................... 356/373; 350/173; 356/28
[58] Field of Search ................... 356/167, 28, 27, 373; 350/173, 286; 250/237 G

[56] References Cited

U.S. PATENT DOCUMENTS

| | | | |
|---|---|---|---|
| 1,947,668 | 2/1934 | Warmisham | 350/286 |
| 2,315,783 | 4/1943 | Gilmore | 350/173 |
| 3,833,299 | 9/1974 | Lang | 250/237 G |
| 3,856,401 | 12/1974 | Heitman et al. | 356/28 |
| 3,904,295 | 9/1975 | Hock et al. | 356/167 |
| 3,943,359 | 3/1976 | Matsumoto et al. | 250/237 R |
| 3,989,384 | 11/1976 | Friedman | 356/152 |

FOREIGN PATENT DOCUMENTS 342036  1/1931  United Kingdom ................. 350/173

Primary Examiner—John K. Corbin
Assistant Examiner—R. A. Rosenberger
Attorney, Agent, or Firm—Schwartz, Jeffery, Schwaab, Mack, Blumenthal & Koch

[57] ABSTRACT

A method for separately evaluating the contents of an image in two coordinate directions of motion by splitting and then reflecting the received image so that the images may be separately analyzed.

An apparatus for performing the method which comprises a beam splitter, a reflector and a correlating grid.

A method of measuring distance by using the apparatus of the invention is also disclosed.

12 Claims, 2 Drawing Figures

PROCESS AND APPARATUS FOR THE SEPARATE EVALUATION OF IMAGE CONTENTS IN TWO COORDINATE DIRECTIONS OF MOTIONcl BACKGROUND OF THE INVENTION

1. Field of the Invention

The present invention relates to a process for separately evaluating the image contents in two coordinate directions of motion. The invention additionally relates to an apparatus for performing the process.

2. Description of the Prior Art

Arrangements capable of detecting and demonstrating the movement of objects without systematic markings which affect the phase or the amplitude of light by optoelectronic means are known. If motion takes place in a plane perpendicular to the direction of observation, the image content of the object must be resolved into the x and y coordinates of the motion, in order to determine the direction of the motion in the plane of motion.

In the simplest form, U.S. Pat. No. 3,677,647 teaches providing a separate imaging and signal evaluating installation for each coordinate direction. However, such an installation results in the equipment being very expensive.

The arrangement described in U.S. Pat. No. 3,904,295 provides only a single common imaging installation and possesses a special local frequency filter followed by a coordinated correlation grid which diffracts in two coordinate directions. The grid is aligned with the filter. In another embodiment, image deflecting means are coordinated with the local frequency filter which deflect the image contents associated with the coordinate directions in different directions so that the contents can be analyzed with the aid of separate, unidimensionally divided correlation grids.

In the first arrangement having the two-coordinate correlation grid, none of the optical structural elements are duplicated. However, during signal evaluation, difficulties may be encountered because of cross induction of individual information channels. Although the second arrangement having the image deflecting means eliminates such difficulties in signal evaluation, it requires an additional correlation grid.

SUMMARY OF THE INVENTION

It is the object of the invention to provide a process as well as an apparatus for performing the process in which the image contents containing directional information as to motion may be evaluated in a simple manner and without increasing the expense for parts constituting the structure for imaging and image correlation in comparison with a unidimensional analysis.

It is a further object of the invention to provide a process and apparatus, the use of which makes possible the separate analysis of information relating to perpendicular motion by splitting such information into two components.

It is yet another object of the invention to provide a prism combination capable of resolving the motion of an object into its various components and then reflecting the resolved images.

As a means of accomplishing the foregoing objects a method is provided for measuring the image contents of an object in two coordinate directions of motion which comprises first splitting the image of the object into two separate images with a beam splitter. The separate images are then reproduced adjacent to one another by rotating the split images by 90° with respect to one another onto a common correlation grid. The grid used is periodic in the x and/or y direction. The two light fluxes which result from the infringement of the images onto the grid are then converted into electric signals which are subsequently measured. In accordance with an alternative embodiment of the invention, the images leaving the beam splitter are reproduced at different scales of magnification before reaching the grid.

According to yet another object of the invention, an apparatus is provided for accomplishing the foregoing objects and for separately measuring the image contents of an object in two coordinate directions of motion. The apparatus comprises an optical device for receiving the image to be measured, a beam splitting means for orthogonally splitting the image received, and a mirror for reflecting the split images received from the beam splitting surface. Additionally, a correlation grid is arranged so as to receive the images reflected by the mirror means. The grid is constructed such that it is periodic in at least one orthogonal direction.

According to another embodiment of the invention, a photoelectric receiver is provided for receiving the images passing through the grid. One or a plurality of separate receivers may be used.

In a preferred embodiment of the invention, the beam splitting means and the mirror means used are formed by a prism combination. The prism combination comprises first, second, third and fourth quadratic prisms. The prisms are arranged such that the base of the first prism is in contact with the base of the second prism so as to form the mirror means. One cathetus of the third prism is arranged against one cathetus of the first prism while one cathetus of the fourth prism is arranged against one cathetus of the second prism such that the second cathetus of the third prism and a second cathetus of the fourth prism are each located in substantially the same plane. The prisms are further arranged such that the third and fourth prisms are arranged along adjacent sides of the first and second prisms.

As part of yet another embodiment of the invention, the apparatus just described may be used to measure distance.

Another aspect of the invention is the prism combination itself which comprises first, second, third and fourth quadratic prisms. The prisms are arranged such that the base of the first prism is in contact with the base of the second prism to form a mirror means. One cathetus of the third prism is arranged against one cathetus of the first prism while one cathetus of the first prism is arranged against one cathetus of the second prism such that a second cathetus of the third prism and a second cathetus of the fourth prism are each located in substantially the same plane. The prisms are arranged such that the third and fourth prisms are located along adjacent sides of the first and second prisms.

DESCRIPTION OF PREFERRED EMBODIMENTS

The objects previously set forth may be attained according to the invention by splitting the image of the object into two images with a beam splitter. The two resulting images are then reproduced by deflecting mirrors next to each other onto a correlation grid which is periodic in the x and/or y direction so that both images are rotated by 90° with respect to each other. The two light fluxes passing through the correlation grid are then converted into electric signals representing the desired measurable quantities by means of a photoelectric receiver system. Particular advantages may be obtained by reproducing orthogonal components of the object with different reproduction scales on the correlation grid.

An apparatus for performing the process of the invention comprises a beam splitter surface placed at an angle of 45° to the optical axis of the system. The splitter surface is placed in the beam path of an optical device receiving the image of the object, and is coordinated in sequence with a mirror surface standing at all times at an angle of 45° to the transmitted and reflected beam, so that the optical axes of the beams split on the splitter surface are parallel to each other. The mirror surfaces are followed in coordination by a correlation grid periodic in the x and/or y direction. The grid is located in an intermediate image plane common to both beams of the imaging optical element. This correlation grid is coordinated with a photoelectric receiver system containing at least one receiver whose output signals represent the quantity to be measured.

In one embodiment, the beam splitter surface and the mirror surface may be formed by a prism combination. The combination is formed by four rectangular prisms of equal length so that the basic surfaces of two of these prisms are located adjacent to one another and include the surface of the beam splitter. The two other prisms, each having one cathetus are arranged adjacent to the cathetus surfaces of the two first prisms in such a manner that the free cathetus surfaces of the two other prisms are located at least approximately in the same plane. The term "cathetus" is meant to denote the sides of the prism forming the right angle opposite the hypotenuse side of the prism. Special applications are possible by designing the imaging optical element as an anamorphic system or by coordinating an additional optical device, affecting the scale of reproduction, with at least one of the beams issuing from the prism combination. Signals obtained by the method or apparatus of the invention can also be used for distance measurements.

Figure 1:
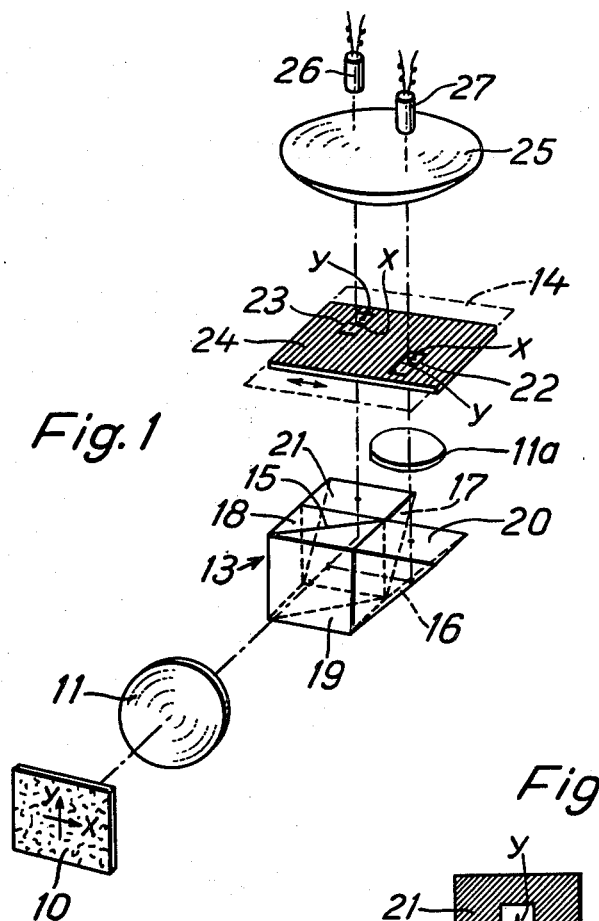
FIG. 1 schematically illustrates the apparatus of the invention.

In FIG. 1, an object whose motion in a plane defined by the x-y coordinates is to be determined, is imaged by way of an imaging optic 11 through a prism combination 13, in a plane 14. Essential components of the prism combination 13 are a beam splitter surface 15 and two mirror surfaces 16 and 17. In the embodiment according to FIG. 1, the prism combination consists of four identical prisms 18, 19, 20 and 21 with rectangular legs of equal length and quadratic cathetus surfaces. Prisms 18 and 19 are arranged with their base surfaces against each other and include the beam splitter surface 15 between them. The mirror surfaces 16 and 17 are formed by the base surfaces of prisms 20 and 21 which are arranged with one of their cathetus surfaces against adjacent cathetus surfaces of the prisms 18 and 19. The two other cathetus surfaces of the prisms 20 and 21 are located in the same plane or in parallel planes.

The prisms 19 and 20 as well as 18 and 21 can each be made as a single component. Nevertheless, a combination of four single prisms has the advantage that the prisms 20 and 21 can still be rotated slightly around the axis of the incident imaging beam in order to take manufacturing tolerances into account and to align the axis of the imaging beams issuing from the prism combination.

Figure 2:
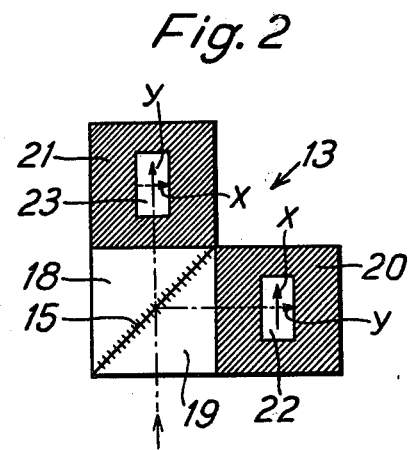
FIG. 2 shows a top view of the prism combination.

The beam path in the prism combination 13 is shown in a top view in FIG. 2. The components of the object 10 are indicated by arrows (x,y). The position of the arrows as drawn in the two image windows 22 and 23 demonstrates the image rotating effect of the mirror surfaces in the prism combination 13. The y component of the beam entering the prism combination standing perpendicularly to the plane of the drawing, lies in the image window 23, in the plane 14 in the direction of the incident beam after transmission through the beam splitter surface 15 and reflection by the mirror surface 17. The x component is rotated by 90° following deflection by the beam splitter surface 15 and lies in the image window 22, in plane 14 after reflection by the mirror surface 16 parallel to the y component.

In the event the object 10 moves in the x direction, the y arrow in the image window 23 also moves in the x direction. Simultaneously, the x arrow in the image window 22 migrates only in the direction of the arrow. If the object 10 moves in the y direction, the y arrow in the image window 23 migrates in the direction of the arrow while the x arrow in the image window 22 migrates perpendicularly to the direction of the arrow.

If, as shown in FIG. 1, a correlation grid 24 is then placed in the plane 14 with its direction of division parallel to the fully drawn arrow directions in the image windows 22 and 23, the light flux passing through the grid 24 in the range of the image windows 22 and 23 will be modulated as a function of the motion of the object 10 in the x and y direction. By way of an optical element 25, the modulated light flux arrives at two photoelectric sensors 26 and 27. Based on the signals received, information concerning the motion of the object 10 can be derived in the known manner. More particularly, if the correlation grid 24 is designed as a prism grid, two photoelectric receivers can be used for each image window 22 and 23 as is disclosed by U.S. Pat. No. 3,856,401, the disclosure of which is herein incorporated by reference.

With a suitable spatial separation of the image windows 22 and 23 it may be convenient to provide a separate optical element for each of the beam paths passing through the image windows, in place of the common optical element 25 shown.

If the optical element 11 is designed as an anamorphic system which distorts the image of the object 10 in the x and y directions, the local frequency distribution in the images to be evaluated can be adapted to the local frequency of the correlation grid 24. This results in an extent of modulation better suited to technical evaluation of the light fluxes arriving at the photoelectric receivers 26 and 27, from a signal standpoint. The same effect can obviously also be obtained by inserting an additional optical device which changes the scale of reproduction for at least one of the beams leaving the prism combination 13 such as illustrated by 11a in FIG. 1.

It is immediately evident that the considerations applied to components of motion fully drawn in the image windows 22 and 23 are valid as well to analogous components in orthogonal positions (drawn in broken lines), if a direction of division orthogonal to the direction of division of the correlation grid 24 is chosen.

Improved signal evaluation by carrier frequency modulation can also be obtained in a known manner by oscillating the correlation grid 24 perpendicular to its direction of division as shown in FIG. 1. Specifically, with an oscillating grid 24, the arrangement described can also be used for distance measurements as is illustrated for example, in German Patent No. 2,330,940 (U.S. Appl. Ser. No. 673,726, U.S. Pat. No. 4,071,297) the disclosure of which is herein incorporated by reference. However, it should be noted that the modulated light fluxes passing through the image windows 22 and 23 yield the same information.

If on the contrary, provision is made, as described above, for different scales of reproduction for the two components of the object, the two modulated light fluxes can be interpreted and used for distance measurements by the method described in German Patent Application P 25 18 209.6, the disclosure of which is hereby incorporated by reference. (U.S. Appl. Ser. No. 671,103, now abandoned).

As used in the specification, the term "optical element" is taken to mean any lens, combination of lenses or the like which may be used to direct or magnify the image being impinged on the beam splitter.

The specification provides a detailed disclosure of particular methods and apparatus. It should be noted, however, that the scope of the invention is not limited to those embodiments specifically disclosed or described but covers instead all embodiments of the invention as well as modifications and alternatives of the invention falling within the scope of the claims.

What is claimed is:

1. A method of evaluating the image contents of an object in two coordinate directions of motion which comprises the steps of:
   splitting the image of the object into two separate images having different orthogonal components with a beam splitter;
   reproducing the said separate images adjacent to one another by rotating the said images by 90° with respect to one another onto a common correlation grid, said grid being periodic in the x and/or y direction;
   converting the two light fluxes resulting from the impingement of said images on said grid into electric signals; and
   measuring the said electric signals.

2. The method as defined by claim 1 further comprising reproducing the separate images of the object at different scales of magnification.

3. The method as defined by claim 1 in which the image is first passed through an optical element prior to being split by said beam splitter.

4. The method as defined by claim 1 wherein said correlation grid is oscillated perpendicular to the images being received.

5. An apparatus for separately measuring the image contents of an object in two coordinate directions of motion, said apparatus comprising:
   an optical element for receiving the image to be measured;
   a beam splitting means for orthogonally splitting the image received;
   a mirror means for reflecting the split images received from the beam splitting surface; and
   a correction grid arranged to receive said images reflected by said mirror means, said grid being constructed such that it is periodic in at least one orthogonal direction;
   said beam splitting means and said mirror means formed by a prism combination, said prism combination comprising first, second, third and fourth quadratic prisms;
   said prisms being arranged such that the base of said first prism is in contact with the base of said second prism to form said mirror means, one cathetus of said third prism being arranged against one cathetus of said first prism and one cathetus of said fourth prism being arranged against one cathetus of said second prism such that a second cathetus of said third prism and a second cathetus of said fourth prism are each located in substantially the same plane and such that said third and fourth prisms are arranged along adjacent sides of said first and second prisms.

6. The apparatus as defined by claim 5 further comprising at least one photoelectric receiver for receiving the images passing through said grid.

7. The apparatus as defined by claim 6 further comprising a plurality of separate receivers.

8. The device as defined by claim 5, wherein said first and third and said second and fourth prisms are contiguous with one another such as to form two separate prisms.

9. The apparatus as defined by claim 5 wherein said optical element is anamorphic.

10. The apparatus as defined by claim 5 wherein a device affecting the scale of magnification is located between said mirror means and said grid.

11. The apparatus of claim 5 wherein said correlation grid is a prism grid.

12. A prism combination comprising first, second, third and fourth quadratic prisms, said prisms being arranged such that the base of said first prism is in contact with the base of said second prism to form a mirror means, one cathetus of said third prism is arranged against one cathetus of said first prism and one cathetus of said fourth prism is arranged against one cathetus of said second prism such that a second cathetus of said third prism and a second cathetus of said fourth prism are each located in substantially the same plane and such that said third and fourth prisms are arranged along adjacent sides of said first and second prisms.

* * * * *